United States Patent
Maeda

(10) Patent No.: US 8,786,884 B2
(45) Date of Patent: Jul. 22, 2014

(54) PRINTING SYSTEM, PRINTING SYSTEM CONTROL METHOD, AND STORAGE MEDIUM

(75) Inventor: Yuuki Maeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 13/225,960

(22) Filed: Sep. 6, 2011

(65) Prior Publication Data

US 2012/0057203 A1 Mar. 8, 2012

(30) Foreign Application Priority Data

Sep. 8, 2010 (JP) ................................. 2010-200828

(51) Int. Cl.
*H04N 1/32* (2006.01)
*H04N 1/04* (2006.01)
*G06K 15/02* (2006.01)

(52) U.S. Cl.
CPC ...................................... *G06K 15/02* (2013.01)
USPC ............................ 358/1.15; 358/468; 358/498

(58) Field of Classification Search
USPC ........ 358/1.15, 468, 444, 474, 404, 498, 400, 358/401
See application file for complete search history.

(56) References Cited

U.S. PATENT DOCUMENTS

| 5,678,138 | A | * | 10/1997 | Kobayashi et al. | ............. 399/18 |
| 6,377,356 | B2 | * | 4/2002 | Sakamoto et al. | ............ 358/1.14 |
| 6,957,025 | B1 | * | 10/2005 | Sinn et al. | ........................ 399/84 |
| 2007/0189783 | A1 | * | 8/2007 | Hattori | ............................ 399/16 |
| 2013/0083112 | A1 | * | 4/2013 | Sano | ................................ 347/16 |

FOREIGN PATENT DOCUMENTS

| JP | 2000-229738 | A | | 8/2000 | |
| JP | 2004-315220 | | * | 11/2004 | ............... B65H 7/06 |
| JP | 2005-060013 | A | | 3/2005 | |
| JP | 2008-065467 | A | | 3/2008 | |
| JP | 2008-179438 | A | | 8/2008 | |

* cited by examiner

*Primary Examiner* — Jerome Grant, II
(74) *Attorney, Agent, or Firm* — Canon USA Inc. IP Division

(57) ABSTRACT

When a user sets a paper attribute to a sheet holding unit, the user can recognize the existence of another sheet holding unit to which the same paper attribute as the paper attribute to be set has been set.

6 Claims, 20 Drawing Sheets

FIG.13

| | | |
|---|---|---|
| ☐ PAPER NAME<br>▷ NORMAL PAPER (80~105 g/m²) 2 | | 1301 — [ CHANGE ▶ ] |
| ☐ PAPER TYPE | ▷ USER-SET PAPER | |
| ☐ GRAMMAGE | ▷ 93 g/m² | 1302 — [ CHANGE ▶ ] |
| ☐ CHARACTERISTIC | ▷ NONE | 1303 — [ CHANGE ▶ ] |
| ☐ SURFACE GRADE | ▷ HIGH-QUALITY PAPER | 1304 — [ CHANGE ▶ ] |
| ☐ ADJUST AMOUNT OF CORRECTION OF CREEP (DEVIATION) | ▷ 0.00 mm | 1305 — [ CHANGE ▶ ] |
| ☐ PAPER COLOR | ▷ WHITE | 1306 — [ CHANGE ▶ ] |

DETAILED SETTING/EDIT

1307 — [ CLOSE ↵ ]

SYSTEM MONITOR/SUSPEND ▶

PRINTING SYSTEM, PRINTING SYSTEM CONTROL METHOD, AND STORAGE MEDIUM

BACKGROUND OF THE INVENTION

1. Field of the Invention

The present invention relates to a printing system, a printing system control method, and a storage medium.

2. Description of the Related Art

In recent years, an image forming apparatus often includes two or more paper feed stages which can be automatically changed to be used. Japanese Patent Application Laid-Open No. 2000-229738 discusses a paper feed control method in which paper attribute information about each type of paper set in a plurality of paper feed stages is stored and if paper cannot be fed from the currently used paper feed stage, the paper feed stage is changed to a paper feed stage whose paper attribute matches the paper attribute of the paper feed stage used thus far, based on the paper attribute information about the paper stored in the other paper feed stages.

With the above-described configuration, the conventional method is capable of automatically changing the paper feed stage when the paper is fully consumed for in the unit of a plurality of groups including a group of pieces of paper attribute information. In addition, in the above-described conventional method, each paper feed stage can be separately set with an automatic paper feed changing function to enable or disable. Accordingly, the above-described conventional method can prevent erroneous feeding of paper set by any other users.

On the other hand, in recent years, the print on demand (POD) market has expanded, in which digital printing is utilized in commercial printing. The types of paper attributes, such as a name, a size, a type, and a grammage of available sheets that can be used on an image forming apparatus for the POD market have been increasing. Accordingly, it is required to set the paper attribute in detail for each paper feed stage. An image forming apparatus discussed by Japanese Patent Application Laid-Open No. 2005-060013, in which the paper name can be uniquely set to each type of paper, uses a paper feed control method configured to change the paper feed stage considering the name of the attribute of paper set in a paper feed stage if the paper has the same paper attribute.

With the above-described configuration, sheets of the same paper attribute can be classified according to the name thereof even if manufacturer-designated sheets and user-selected sheets, whose tint and surface nature are different, are used. Accordingly, the conventional method can prevent mixed feeding of sheets of different types. In addition, because the conventional method feeds the sheets of the same name, the user is not required to change a setting for automatically changing the paper feed stage for each paper feed stage every time the user inputs a print job even in an environment in which a large number of users use different types of paper.

However, when a specific unique name is designated in a job, it is necessary for a printer driver or an application configured to generate job data to previously acquire the name of paper registered to an image forming apparatus used in printing the job. For example, it is necessary for a job data generation application generated by a third party to acquire the name of paper used on a target image forming apparatus to be used in printing a job if the name of paper registered to the image forming apparatus is to be acquired as described above.

In addition, in order to achieve the above-described effect, it is necessary for the job data generation application every time paper is newly registered to the image forming apparatus to acquire information about the newly registered paper. Accordingly, the image forming apparatus is required to include an interface for acquiring the registered paper information. In addition, the third party is required to support the interface. Therefore, the cost for development and processing load on the application may increase. In order to prevent this, the name of a paper attribute can be designated based on a common attribute of paper, such as the grammage, the color, the surface nature, or the shape of the sheet, instead of using a name of paper uniquely set on the image forming apparatus.

However, in an environment used in the POD market in which an operator executes printing, the operator may desire not to use any paper other than paper set by the operator even if the other paper has the same attribute as the paper set by the operator. For example, if one operator has set sheets of light yellow to one paper feed stage and the other operator has set sheets of the same color to the other paper feed stage, the density or the brightness of the color of light yellow may slightly differ. In other words, different operators may set the color of each paper differently. Accordingly, an output result desired by the operator may not be acquired.

However, in the above-described POD market, it is considered primarily important that an output product has a high quality, and it is very important that an output result desired by the operator can be acquired. Accordingly, a printing system in which paper other than the paper set by the operator himself/herself, even if the paper has the same attribute, is not used in printing is desired.

In the method discussed in Japanese Patent Application Laid-Open No. 2000-229738, feeding of paper other than the paper that the operator himself/herself desires to use can be prevented by selecting a paper feed stage to be set for an automatic paper changing target every time paper is set. However, in Japanese Patent Application Laid-Open No. 2000-229738, it becomes always necessary for the operator to reset the setting for the automatic paper change by verifying the current paper feed stage set for the automatic paper change target before each print job is started.

In addition, if the other operator sets the paper having the same attribute as that of a currently printed job when setting paper to be used in subsequent printing in the paper feed stage during printing and if the paper is fully consumed during the currently printed job, then the automatic paper change may be executed. Accordingly, in the method discussed in Japanese Patent Application Laid-Open No. 2000-229738, if printing of another job is currently in process, it is necessary for the operator to update the setting by verifying the paper feed stage set for the automatic paper change target insetting the paper as well as when the timing of starting printing the input job has come.

Due to the reason described above, it is necessary to execute complicated operations to prevent erroneous feeding of paper that has not been set for automatic paper change by securely feeding paper desired by the operator while using the automatic paper change function, which can implement continued printing even if the paper is fully consumed.

SUMMARY OF THE INVENTION

According to an aspect of the present invention, a printing system including a plurality of sheet holding units, the printing system includes a setting unit configured to set a paper attribute of a sheet accommodated in a sheet holding unit, a storing unit configured to store the paper attribute set by the setting unit with respect to each sheet holding unit, an image forming unit configured to form an image on the sheet fed from the sheet holding unit, a control unit configured, in a case where the sheet cannot be fed from a sheet holding unit currently feeding the sheet during image forming by the image forming unit, to continue feeding the sheet by switching the sheet holding unit from the sheet holding unit that cannot feed the sheet to another sheet holding unit that can feed a sheet, a determining unit configured, when the paper attribute is set by the setting unit to the sheet holding unit, to determine whether a sheet holding unit to which the same paper attribute as the paper attribute to be set is set has been stored on the storing unit, and a display unit configured, in a case where the determining unit determines that the sheet holding unit to which the same paper attribute as the paper attribute to be set is set has been stored on the storing unit, to display information, on the display unit, indicating that another sheet holding unit to which the same paper attribute as the paper attribute to be set has been set exists, wherein the control unit is configured, in a case where an instruction for setting the paper attribute is received from a user after the display is executed by the display unit, to switch the sheet holding unit by using the sheet holding unit to which the paper attribute has been set by the setting unit and the another sheet holding unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 13 illustrates an example of a UI displayed on the touch panel unit illustrated in FIG. 4.

DESCRIPTION OF THE EMBODIMENTS

Various exemplary embodiments, features, and aspects of the invention will be described in detail below with reference to the drawings.

In order to solve the issue described above in "Description of the Related Art", a first exemplary embodiment of the present invention supposes a printing environment different from an office environment, such as the print on demand (POD) environment. A system environment of the entire installation location of a POD environment including a printing system 1000 (i.e., a printing environment 10000 illustrated in FIG. 1) will be described in detail below. The printing environment can also implement the present exemplary embodiment as one of characteristics thereof.

In the present exemplary embodiment, the printing environment 10000, to which the printing system 1000 can be applied, is referred to as a POD system 10000 because the printing environment 10000 is appropriate for the POD environment.

Figure 1:
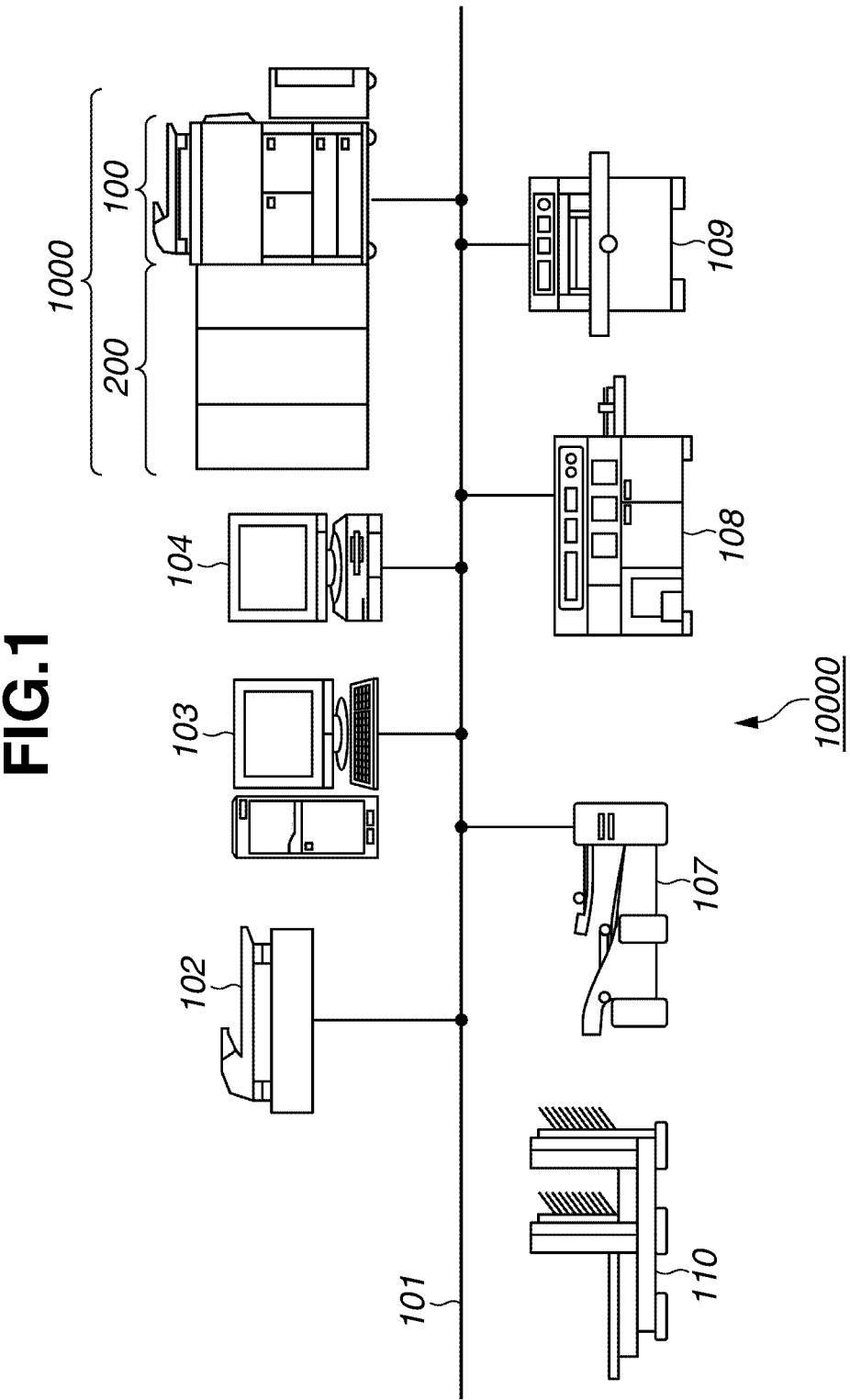
FIG. 1 illustrates an exemplary configuration of a printing system according to an exemplary embodiment of the present invention.

FIG. 1 illustrates an exemplary configuration of the printing system according to the present exemplary embodiment. Referring to FIG. 1, the POD system 10000 includes components, such as the printing system 1000, a server 103, and a client 104 according to the present exemplary embodiment. Each of the server 103 and the client 104 is a computer, such as a personal computer (PC) or the like. In addition, the POD system 10000 includes a paper folding machine 107, a cutting machine 109, a saddle stitch binding machine 110, a case binding machine 108, and a scanner 102. The above-described plurality of apparatuses is provided to the POD system 10000.

The printing system 1000 includes components, such as a printing apparatus 100 and a sheet processing apparatus 200. In the present exemplary embodiment, a multifunction peripheral (MFP), which includes a plurality of functions, such as a copy function and a print function, is described as an example of the printing apparatus 100. However, a single-function printing apparatus having the copy function or the print function only can be used as the printing apparatus 100.

Each of the paper folding machine 107, the case binding machine 108, the cutting machine 109, and the saddle stitch binding machine 110 illustrated in FIG. 1 is defined as a sheet processing apparatus similar to the sheet processing apparatus 200 included in the printing system 1000.

In other words, these sheet processing apparatuses are devices that are capable of executing sheet processing on a sheet used in a job printed by the printing apparatus 100 included in the printing system 1000. The paper folding machine 107 can execute folding processing on a sheet used in the job printed by the printing apparatus 100.

The cutting machine 109 can execute cutting processing on the sheet used in the job printed by the printing apparatus 100. The saddle stitch binding machine 110 can execute saddle stitch binding processing on the sheet printed by the printing apparatus 100. The case binding machine 108 can execute case binding on a bundle of the sheets printed by the printing apparatus 100.

However, in executing various types of sheet processing by the above-described sheet processing apparatuses, it is necessary for an operator to take out a printed product of a job printed by the printing apparatus 100 from a paper discharge unit of the printing apparatus 100 and to set the print product on a sheet processing apparatus to be used in executing post-processing.

As described above, in utilizing the sheet processing apparatus except the sheet processing apparatus 200 included in the printing system 1000 itself, the operator is required to execute an interacting operation after print processing by the printing apparatus 100 is completed.

To paraphrase this, if sheet processing, which is necessary for a job printed by the printing apparatus 100, is executed by utilizing the sheet processing apparatus 200 included in the printing system 1000 itself, the operator is not required to execute an interacting operation after the print processing by the printing apparatus 100. This is because a sheet printed by the printing apparatus 100 can be fed directly from the printing apparatus 100 to the sheet processing apparatus 200 in the present exemplary embodiment.

More specifically, a sheet conveyance path included in the printing apparatus 100 can be connected to a sheet conveyance path included in the sheet processing apparatus 200. As described above, the sheet processing apparatus 200 and the printing apparatus 100 included in the printing system 1000 itself are physically connected with each other. In addition, each of the printing apparatus 100 and the sheet processing apparatus 200 includes a central processing unit (CPU). The printing apparatus 100 and the sheet processing apparatus 200 can execute a data communication therebetween by using the CPU. In other words, the printing apparatus 100 and the sheet processing apparatus 200 are electrically connected with each other.

In the present exemplary embodiment, a control unit provided to the printing system centrally controls the printing apparatus 100 and the sheet processing apparatus 200. For example, a controller unit 205 in FIG. 2, which is provided to the printing apparatus 100, centrally controls the operation of the printing apparatus 100 and the sheet processing apparatus 200. In the present exemplary embodiment, the above-described sheet processing apparatuses are referred to as "post-processing apparatuses" or "postpresses".

All the plurality of apparatuses included in the POD system 10000 illustrated in FIG. 1 except the saddle stitch binding machine 110 are connected to a network 101 and can execute a data communication with one another via the network 101.

Print data of a job to be processed, whose print execution request has been transmitted from a personal computer (PC), which is an example of an external apparatus such as the server 103 and the client 104, is printed by the printing apparatus 100.

The server 103 manages all jobs to be processed within the present POD system 10000 by executing a data communication with the other apparatuses by a network communication. To paraphrase this, the server 103 functions as a computer configured to centrally manage all processes in a series of a work flow including a plurality of processing steps.

The server 103 determines a post-processing condition, which can be used for finishing within the present POD system 10000 according to an instruction for a job input by the operator. Further, the server 103 transmits an instruction for executing post-processing (finishing) as desired by an end user (in the present exemplary embodiment, a customer who has requested to generate a print product). In instructing the post-processing, the server 103 exchanges information with each post-processing apparatus according to a command processed within the postpress and status information about the postpress using an information interchanging tool, such as job definition format (JDF).

[Inner Configuration of the Printing System 1000 (Primarily the Software Configuration)]

An inner configuration (primarily the software configuration) of the printing system 1000 will be described in detail below with reference to FIG. 2.

Figure 2:
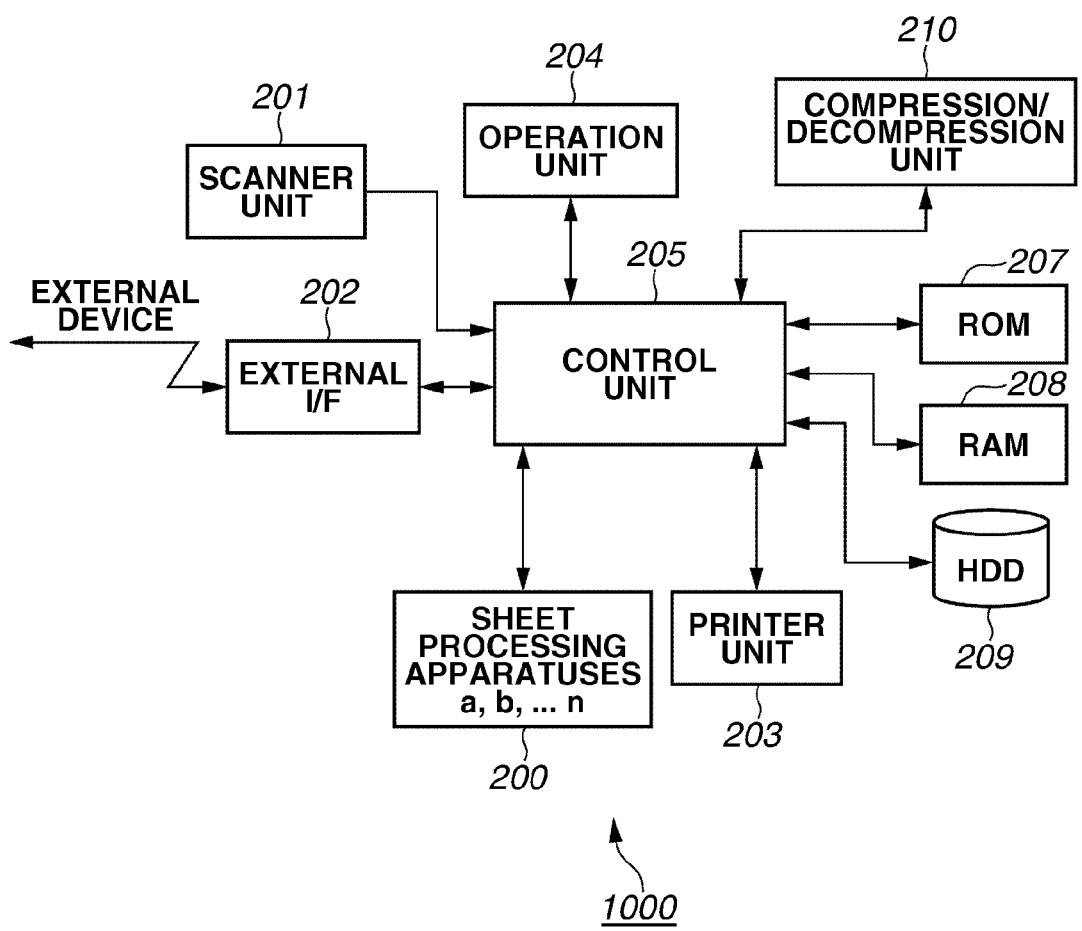
FIG. 2 is a block diagram illustrating an exemplary inner configuration of the printing system illustrated in FIG. 1.

FIG. 2 is a block diagram illustrating an inner configuration of the printing system illustrated in FIG. 1. In the present exemplary embodiment, in the example illustrated in FIG. 2, units included in the printing system 1000 except the sheet processing apparatus 200 (to be precise, a group of serially connected sheet processing apparatuses, which can be constituted by a plurality of inline type sheet processing apparatuses) are included in the printing apparatus 100.

To paraphrase this, the sheet processing apparatus 200 is a sheet processing apparatus provided detachably from the printing apparatus 100 and can be provided as an optional apparatus to the printing apparatus 100. With the above-described configuration, a number of inline finishers used in the POD environment can be provided. Accordingly, the printing apparatus 100 included in the printing system 1000 employs the following configuration.

Referring to FIG. 2, the printing apparatus 100 includes a non-volatile memory, such as a hard disk drive (hereinafter simply referred to as an "HDD") 209 that can store data of a plurality of jobs to be processed. Further, the printing apparatus 100 includes a copy function for printing job data received from a scanner unit 201 included in the printing apparatus 100 itself by a printer unit 203 via the HD 209. Furthermore, the printing apparatus 100 includes a function for printing job data received from the external apparatus, such as the client 104, via an external interface (I/F) unit 202, which is an example of a communication unit, by the printer unit 203 via the HDD 209.

The printing apparatus 100 is an MFP type printing apparatus (also referred to as an image forming apparatus), which has the plurality of above-described functions. In other words, the printing apparatus according to the present exemplary embodiment, either a printing apparatus capable of executing color printing or a printing apparatus capable of executing monochromatic printing, can employ any configuration if the printing apparatus can execute various controls according to the present exemplary embodiment.

In the present exemplary embodiment, the printing apparatus 100 includes the scanner unit 201 that reads an image of a document and executes image processing on read image data. Further, the printing apparatus 100 includes the external I/F unit 202 that transmits and receives image data to and from a facsimile apparatus, a network-connected apparatus, and an external dedicated apparatus.

In addition, the printing apparatus 100 includes the HDD 209. The HDD 209 can store image data of a plurality of jobs to be printed, which is received from either one of the scanner unit 201 and the external I/F unit 202. Furthermore, the printing apparatus 100 includes the printer unit 203 that executes print processing of data of the job to be processed, which is stored on the HDD 209, on a print medium.

In addition, the printing apparatus 100 includes an operation unit 204, which is an example of a user interface (UI) unit included in the printing system 1000. The operation unit 204 includes a display unit. As another example of the UI unit provided to the printing system 1000, a display unit, a keyboard, and a mouse of the external apparatus, such as the server 103 and the client 104, are used.

The controller unit (a control unit or a CPU) 205, which is an example of the control unit provided to the printing system 1000, centrally controls processing and an operation executed by various units included in the printing system 1000.

Figure 7:
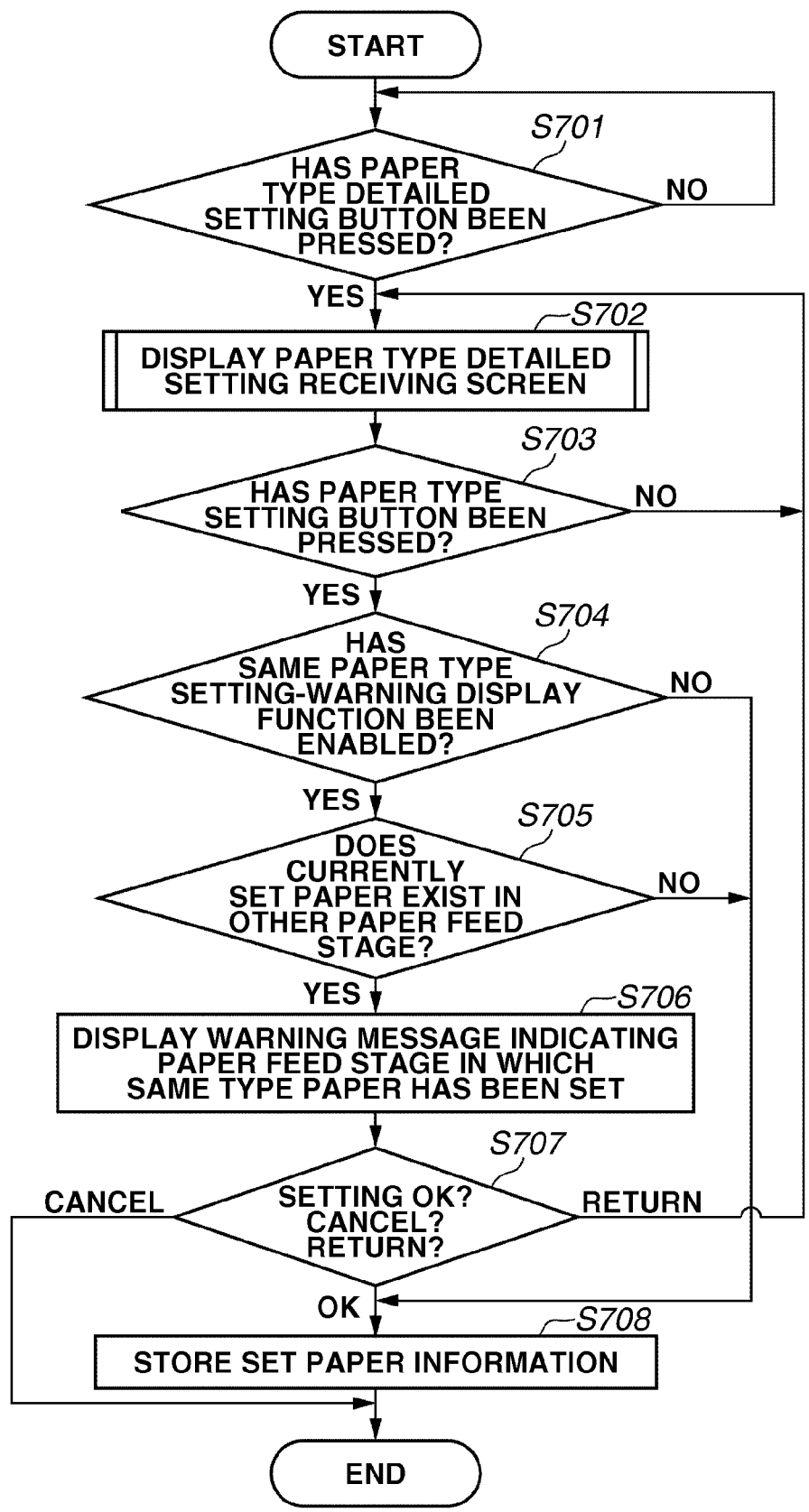
FIG. 7 is a flow chart illustrating a procedure for controlling the printing system.
Figure 16:
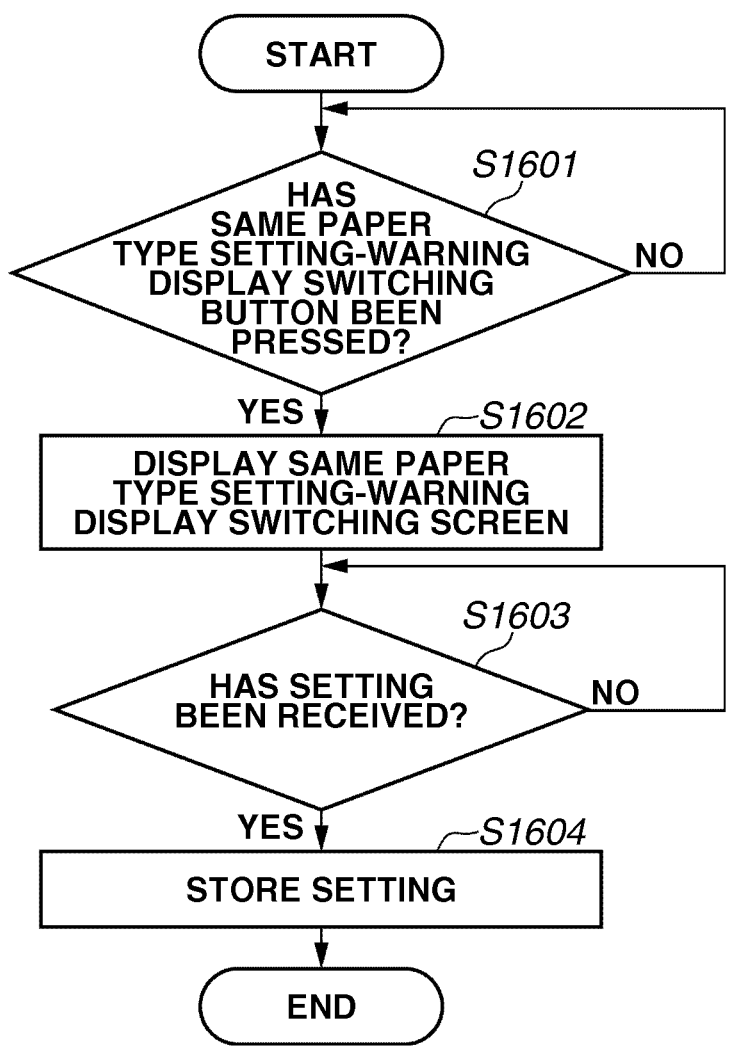
FIG. 16 is a flow chart illustrating a procedure for controlling the printing system.

A read-only memory (ROM) 207 stores various control programs necessary in the present exemplary embodiment, which includes a program for executing various types of processing according to flow charts in FIG. 7 and FIG. 16. Further, the ROM 207 stores a display control program for displaying various user interface screens (hereinafter referred to as "UI screens") on the display unit of the operation unit 204, which includes UI screens illustrated in the drawings.

The control unit 205 loads and executes the program from the ROM 207 and controls the printing apparatus to execute various operations according to the present exemplary embodiment. The ROM 207 stores a program for executing an operation for analyzing page description language (PDL) data received from the server 103 and the client 104 via the external I/F unit 202 and for rasterizing the data into raster image data (bitmap image data). The above-described data and program are processed by software.

The ROM 207, which is a read-only memory, stores a program, such as a boot sequence or font information, and various programs including the above-described program. A random access memory (RAM) 208 is a rewritable memory and stores image data transmitted from the scanner unit 201 and the external I/F unit 202 via a memory controller 206, various programs, and setting information.

The HDD 209 is a mass storage device configured to store image data compressed by a compression/decompression unit 210. The HDD 209 can store a plurality of pieces of data, such as print data of a job to be processed.

The control unit 205 executes control for printing data of a job to be processed, which is input by various input units, such as the scanner unit 201 or the external I/F unit 202, by the printer unit 203 via the HDD 209. The control unit 205 executes control for transmitting the data of the job to be processed to the external apparatus via the external I/F unit 202. As described above, the control unit 205 executes control for executing various types of processing for outputting data of the job to be processed, which is stored on the HDD 209.

The compression/decompression unit 210 compresses or decompresses image data stored on the RAM 208 and the HDD 209 by various compression methods, such as Joint Bi-level Image Experts Group (JBIG) or Joint Photographic Experts Group (JPEG).

With the above-described configuration, the control unit 205, which is an example of the control unit included in the present printing system, controls an operation of the inline type sheet processing apparatus 200 as illustrated in FIG. 1. A mechanical configuration of the printing system 1000, which includes the above-described configuration, will be described in detail below with reference to FIG. 3.

[Mechanical Configuration of the Printing System 1000]

An exemplary configuration of the printing system 1000 will be described in detail below with reference to a cross section illustrated in FIG. 3. In the following description, the configuration of the printing system 1000 will be described in relation to an operation executed when a copy job is performed.

Figure 3:
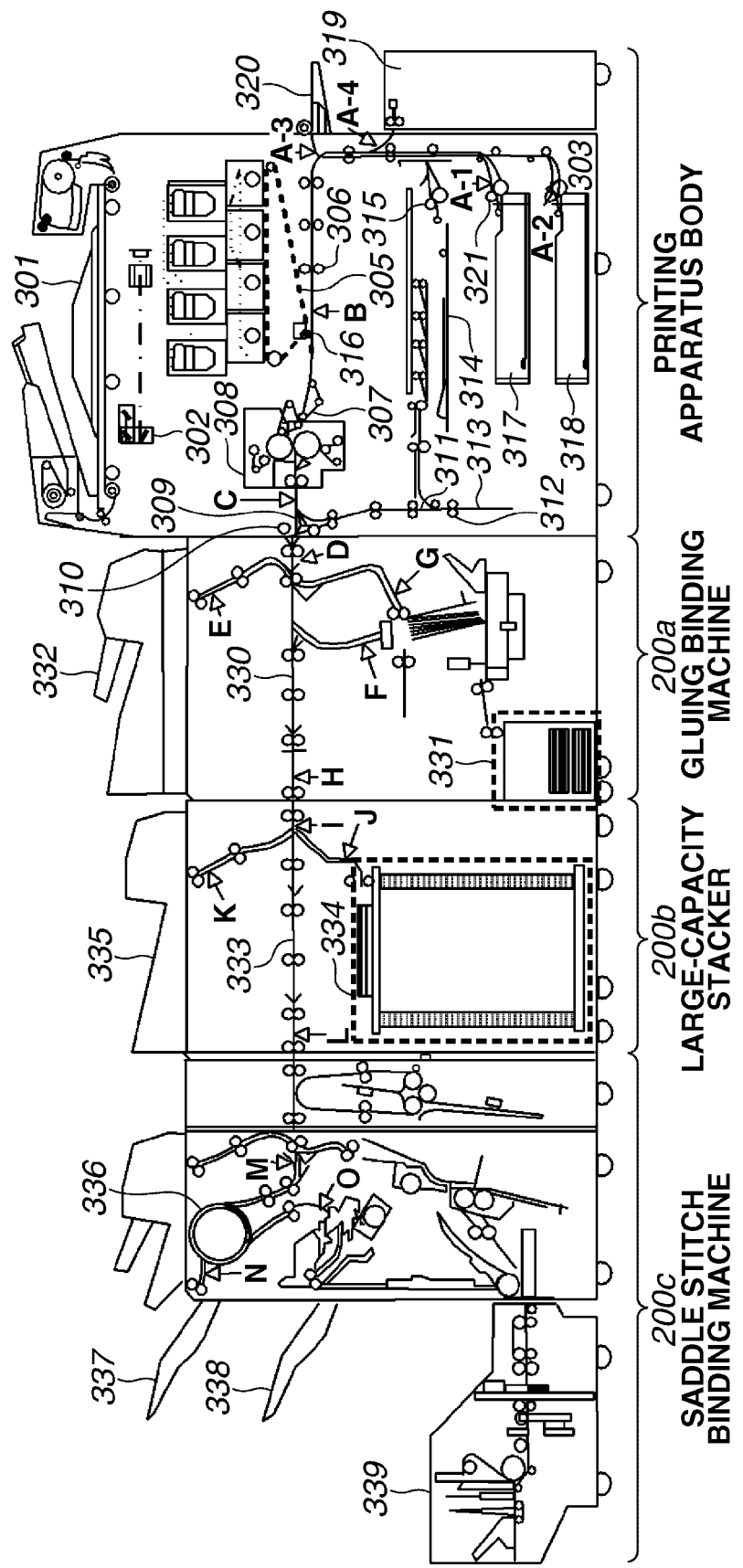
FIG. 3 is a cross section illustrating an exemplary configuration of the printing system illustrated in FIG. 1.

Referring to FIG. 3, an auto document feeder (ADF) 301 is provided to the scanner unit 201. The ADF 301 separates a document from a plurality of documents set by a user on a document tray one by one starting from a top of the plurality of documents and conveys the separated document onto a document mounting glass. A reading unit 302 reads an image of the document conveyed onto the document mounting glass using a charge-coupled device (CCD). The reading unit 302 converts the read document image into image data. The converted image data is stored on the memory, such as the RAM 208 or the HDD 209, under control of the control unit 205.

The printing apparatus 100 has a configuration of a tandem type color printer including a plurality of photosensitive members (drums) and includes a paper feed unit, such as paper feed cassettes 317 and 318 or a manual feed tray 320. A sheet can be fed from any of these paper feed units. If the control unit 205 determines that the sheet cannot be fed from a paper feed stage (i.e., a sheet holding unit) that is currently feeding sheets during the image forming operation by the printing apparatus 100 serving as an image forming unit, executes control for continuing the sheet feeding operation by changing the paper feed stage from the paper feed stage that has been determined not to be able to feed the sheet to another paper feed stage that can feed the sheet.

A paper feed deck 319, which is a paper feed unit and can store a large quantity of sheets, is connected to the printing apparatus 100. Accordingly, a sheet can be fed from the paper feed deck 319. The printing apparatus 100 executes control for stopping the sheet fed from any of the paper feed units at registration rollers 306 to synchronize an operation for conveying the sheet with an operation of an intermediate transfer belt 305.

When any sheet to which an image is to be transferred exists at the position of the registration rollers 306, a sheet to be used for a next printing operation can be fed from any one of the paper feed cassettes 317 and 318, the paper feed deck 319, and the manual feed tray 320. By feeding the sheet in the above-described manner, intervals between conveyance of a plurality of sheets can be shortened. As a result, the productivity of the printing can be increased.

The image data temporarily stored on the RAM 208 and the HDD 209 is transferred to the printer unit 203. The image data is then converted by a laser recording unit (not illustrated) into recording laser light of each of four colors including yellow (Y), magenta (M), cyan (C), and black (K). The photosensitive drum of each color is irradiated with the recording laser light of each color and an electrostatic latent image corresponding to each color is formed on the photosensitive member. Then, a toner image development operation is executed using four color toners supplied from respective toner cartridges. Subsequently, visualized toner images are primarily transferred from the photosensitive member to the intermediate transfer belt 305.

The intermediate transfer belt 305 rotates in a clockwise direction in FIG. 3. When the intermediate transfer belt 305 has rotated to a specific position, the conveyance of the sheet that has been stopped at the registration rollers 306 is started. The specific position is a position at which a substantial leading edge of the sheet is conveyed to a secondary transfer position 316 when the leading edge of the image transferred on the intermediate transfer belt 305 reaches the secondary transfer position 316. In the above-described manner, the toner images on the intermediate transfer belt 305 are transferred onto the sheet at the secondary transfer position 316.

The sheet having the toner images transferred thereon is then further conveyed by a belt 307. The toners are fixed on the sheet by pressure and heat applied thereto by a fixing device 308. After the sheet is conveyed through the sheet conveyance path, the sheet is discharged. A paper discharge flapper 309 can oscillate around an oscillation shaft and regulates the sheet conveyance direction. When the paper discharge flapper 309 oscillates in the clockwise direction in FIG. 3 and is stationary at an oscillated position, the sheet discharged from the fixing device 308 is then conveyed in a horizontal direction by a paper discharge roller 310 to a gluing binding machine 200a. The gluing binding machine 200a is one of the sheet processing apparatuses 200. In the above-described manner, one-sided printing is executed.

On the other hand, when an image is printed on both sides of the sheet, the paper discharge flapper 309 oscillates in the counterclockwise direction in FIG. 3 and stops at the counterclockwise-oscillated position. Subsequently, the conveyance path of the sheet discharged from the fixing device 308 is changed downwards to be conveyed into a two-sided conveyance unit. The two-sided conveyance unit includes a reverse flapper 311, reverse rollers 312, a reverse guide 313, and a two-sided tray 314.

The reverse flapper 311 oscillates around an oscillation shaft and regulates the sheet conveyance direction. In executing two-sided printing, the control unit 205 executes control for oscillating the reverse flapper 311 in the counterclockwise direction in FIG. 3 and for conveying the sheet having the image printed on a first surface of the sheet into the reverse guide 313 via the reverse rollers 312.

The reverse rollers 312, which are provided at an entrance to the reverse guide 313, are temporarily stopped in a state in which a trailing edge of the sheet is pinched therebetween. Subsequently, the reverse flapper 311 is oscillated in the clockwise direction in FIG. 3 and the reverse rollers 312 are rotated in the reverse direction. In the above-described manner, the control unit 205 executes control for conveying the sheet by a switch-back operation and for guiding the sheet onto the two-sided tray 314 in a state in which the leading edge and the trailing edge thereof are set in the reverse orientation.

The sheet is temporarily stored on the two-sided tray 314. Subsequently, the sheet is conveyed by a paper re-feed roller 315 to the registration rollers 306 again. At this timing, the sheet is conveyed to the registration rollers 306 in a state in which a second surface of the sheet, which is the opposite side of the first surface on which the toners are transferred by a first-surface transfer process, faces the intermediate transfer belt 305.

Images are formed on the second surface of the sheet by a process similar to the first-surface transfer process. After the images formed on the sheet second surface are fixed by the fixing device 308, the sheet having the images formed and fixed thereon is conveyed by the paper discharge roller 310 to the gluing binding machine 200a, which is one of the sheet processing apparatuses 200. Two-sided printing is executed in the above-described manner.

Sheet detection sensors are provided to the printing system 1000 on each of the sheet conveyance paths provided to the printing apparatus 100, which is configured to form an image on the sheet fed from the paper feed stage, the gluing binding machine 200a, a large-capacity stacker 200b, and a saddle stitch binding machine 200c, which are also sheet processing apparatuses 200.

More specifically, the sheet detection sensors are provided at an entrance and an exit of each apparatus and at a branch point and a confluence between the sheet conveyance paths. In FIG. 3, an example of a position at which the sheet detection sensor is provided is illustrated with a triangle mark. In other words, sheet detection sensors A through O are provided to the printing system 1000. By receiving a signal from each of the sheet detection sensors, the control unit 205 detects whether a sheet conveyed via the sheet conveyance path is present and the position of the sheet if any is present.

For example, if a signal from a specific sheet detection sensor is continuously transmitted for a specific time period or longer, the control unit 205 determines that a sheet stay jam (clogging) has occurred at a position corresponding to the sensor that currently and continuously transmits the signal. On the other hand, if a sheet that has passed a specific sheet detection sensor does not pass a next sheet detection sensor for a specific time period or longer, the control unit 205 determines that a sheet delay jam (clogging) has occurred at a position between the positions of the specific sheet detection sensor and the next sheet detection sensor.

If a sheet jam (clogging) has occurred on the sheet conveyance path of the printing system 1000, the control unit 205 executes control for suspending the current printing and for displaying the position of the sheet to be removed and a method for removing the sheet as guidance information according to the signal from the sheet detection sensor.

The user can recognize the location of the sheet to be removed within the printing system 1000 and remove the sheet from the sheet conveyance path by opening the apparatus door according to the displayed guidance information.

After all jammed sheets are removed, the user inputs an instruction to resume the printing via the operation unit 204. When the instruction for resuming the printing is received, the control unit 205 resumes the printing. In the present exemplary embodiment, the printing is restarted from the printing on the sheet that is not normally discharged when the printing is suspended.

Sheet detection sensors, which serve as paper feed sensors, A-1, A-2, A-4, and A-3 are respectively provided at paper feed ports of the paper feed cassettes 317 and 318, the paper feed deck 319, and the manual feed tray 320. The paper feed sensors detect a fed sheet and transmit a sheet detection signal to the control unit 205. The control unit 205 counts the number of sheets fed from each paper feed unit according to the sheet detection signal received from the paper feed sensors.

The control unit 205 stores a count value on the RAM 208. The control unit 205 can verify the number of sheets fed from each paper feed unit, which are fed when a job is executed, by referring to the stored value.

A paper discharge sensor N is provided to the paper discharge unit 337 of the saddle stitch binding machine 200c. The paper discharge sensor N detects the sheet discharged to the paper discharge unit 337 and transmits a sheet discharge signal to the control unit 205. The control unit 205 counts the number of discharged sheets according to the received sheet discharge signal.

The control unit 205 stores a count value on the RAM 208. The control unit 205 can verify the number of sheets discharged onto the sheet discharge unit 337 for the executed job according to the stored value.

In the present exemplary embodiment, it is supposed that the printing apparatus 100 is a four-drum (4 D) type color MFP. However, the configuration of the printing apparatus 100 is not limited to this. A monochromatic MFP or a one-drum (1 D) type color MFP can be used as the printing apparatus 100.

The operation and the configuration of the present exemplary embodiment are described using a copy job as an example. On the other hand, when a print job is executed, a printing operation similar to the operation described above is executed with the above-described configuration with using print data from the external I/F unit 202 instead of using image data from the scanner unit 201.

[Configuration of the Operation Unit 204, which is an Example of the UI Unit of the Printing System 1000]

Figure 4:
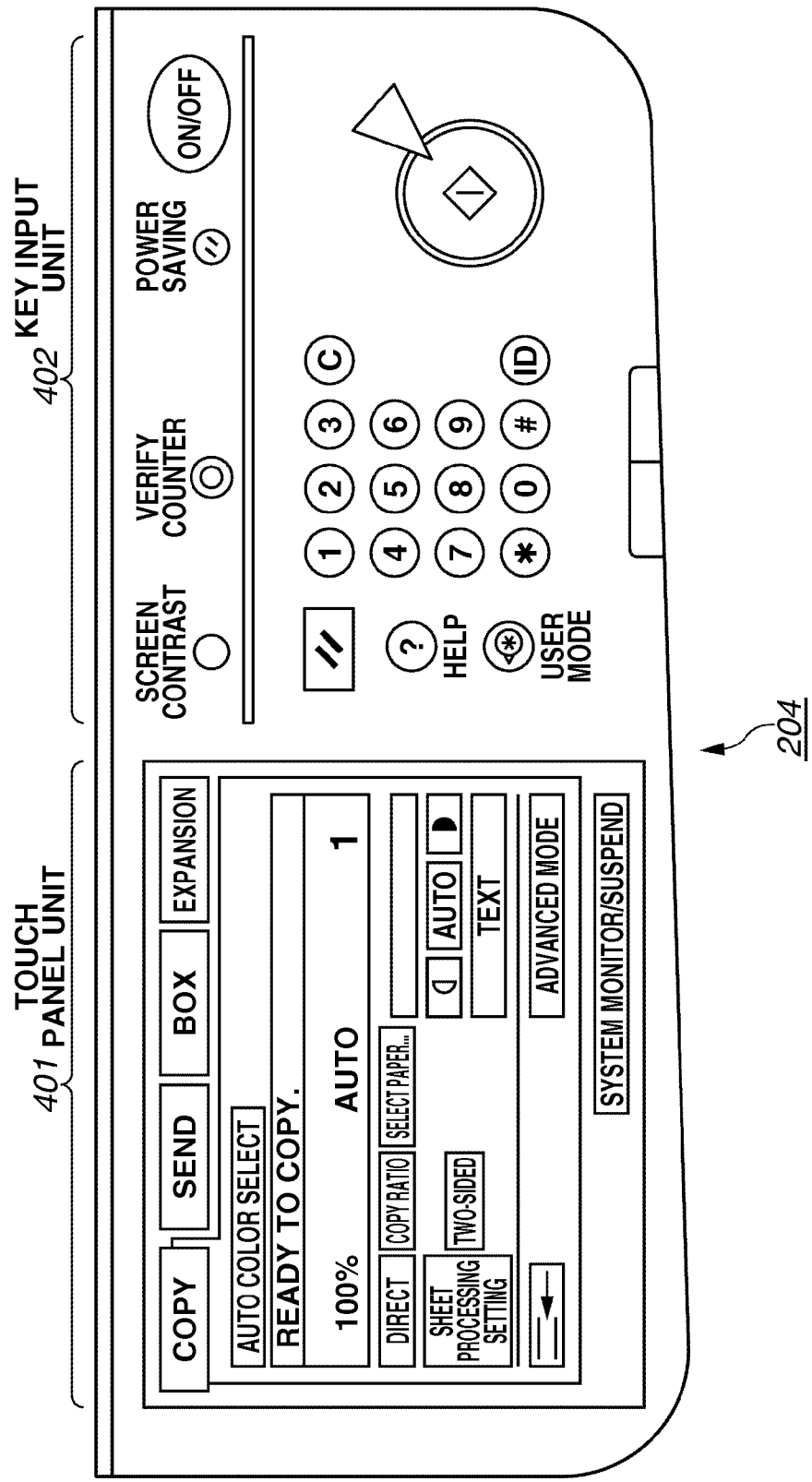
FIG. 4 is a plan view illustrating an exemplary configuration of an operation unit illustrated in FIG. 2.

The operation unit 204, which is an example of the UI unit of the printing system 1000, which is provided to the printing apparatus 100 of the printing system 1000, will be described in detail below with reference to FIG. 4.

The operation unit 204 includes a key input unit 402 and a touch panel unit 401. The key input unit 402 can receive a user operation input by selecting a hard key. The touch panel unit 401 is an example of the display unit, which can receive a user operation input by selecting a soft key (display key).

Figure 5:
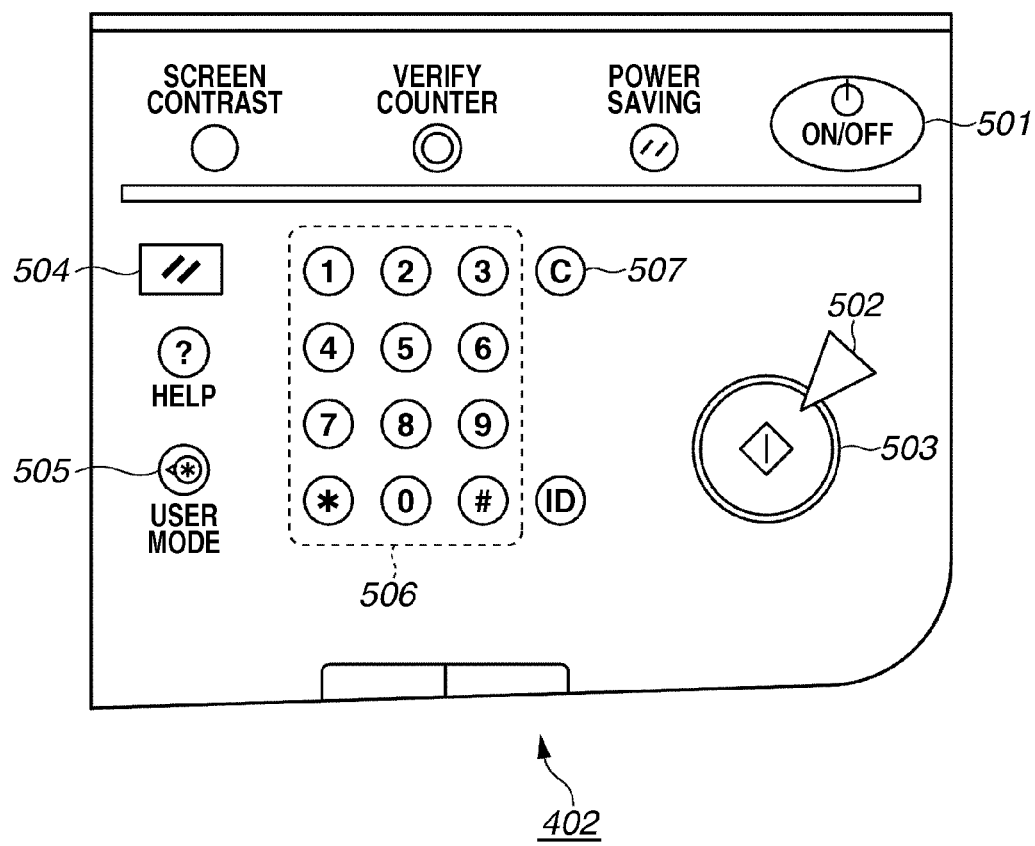
FIG. 5 is a plan view illustrating an exemplary configuration of the operation unit illustrated in FIG. 2.

As illustrated in FIG. 5, the key input unit 402 includes an operation unit power switch 501. According to a user operation of the operation unit power switch 501, the control unit 205 executes control for selectively switching between a standby mode and a sleep mode. The standby mode is a normal operation mode. In the sleep mode, the program is suspended in an interruption waiting state to be ready for executing network printing or facsimile transmission, thus power consumption is saved in the sleep mode.

The control unit 205 executes control for receiving a user operation of the operation unit power switch 501 when a main power switch (not illustrated) for supplying power to the entire system is an ON state. A start key 503 receives a user input for instructing the printing apparatus to start processing of a job instructed by the user, such as a copy operation or a transmission operation of the job to be processed.

A stop key 502 is a key for receiving a user instruction for suspending the processing of the received job currently in process by the printing apparatus. Numeral keys 506 can be operated by the user to set a numerical value for various settings. A clear key 507 is a key for cancelling various parameters, such as a numerical value set by the user via the numeral keys 506.

A reset key 504 can be operated to disable various settings set by the user to the job to be processed and to receive a user instruction for returning the setting value to a default value. A user mode key 505 is a key for shifting the screen to a system setting screen provided to each user.

Figure 6:
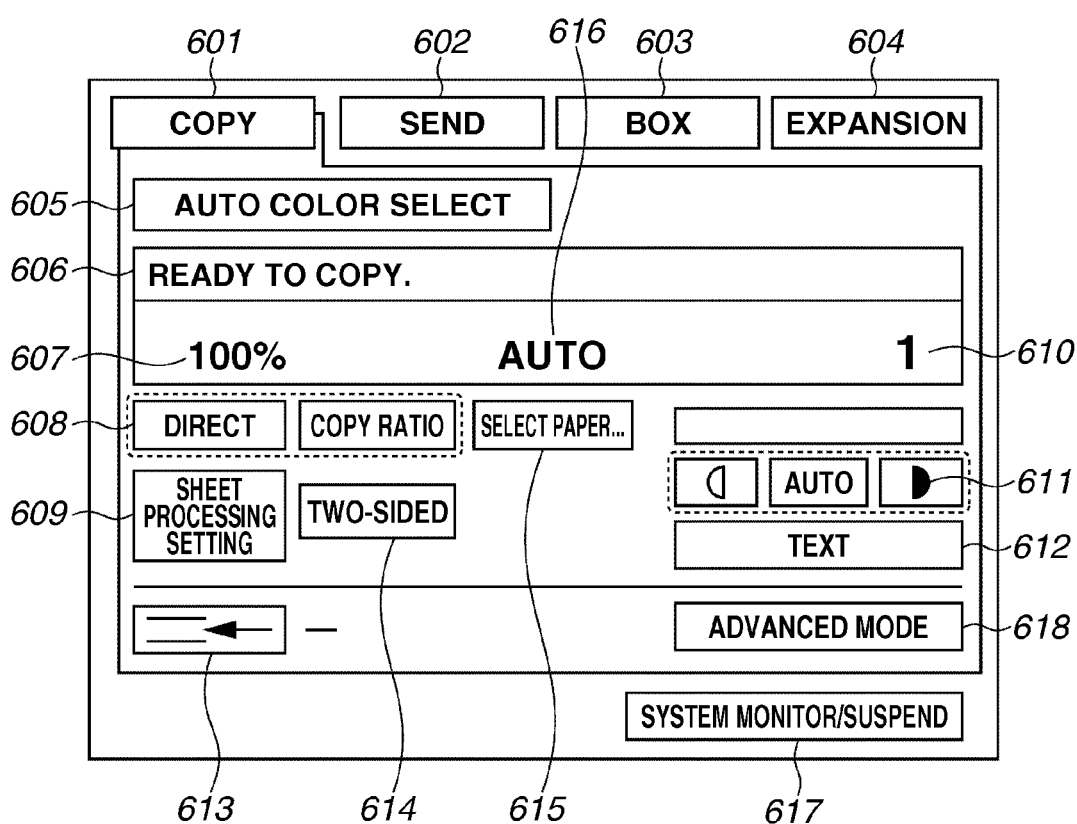
FIG. 6 illustrates an example of a user interface (UI) displayed on a touch panel unit illustrated in FIG. 4.

FIG. 6 illustrates the touch panel unit (hereinafter also referred to as a display unit) 401, which is an example of the UI unit provided by the present printing system 1000. The touch panel unit 401 includes a liquid crystal display (LCD) and a touch panel display, which is attached on the LCD and includes a transparent electrode. The touch panel unit 401 includes both a function for receiving various settings input by the operator and a function for presenting information to the operator.

If it is detected that a position on the LCD corresponding to the display key displayed in an enabled state is pressed by the user, the control unit 205 executes control for displaying an operation screen corresponding to the user operation of the key on the touch panel unit 401 according to the display control program previously stored on the ROM 207. FIG. 6 illustrates an example of an initial screen displayed on the touch panel unit 401 when the printing apparatus 100 is in the standby mode (a state in which no job is to be processed by the printing apparatus 100).

The control unit 205, which is an example of the control unit included in the printing system 1000, executes the following exemplary control.

FIG. 7 is a flow chart illustrating a procedure for controlling the printing system 1000 according to the present exemplary embodiment. The processing corresponds to a control procedure executed if it is instructed to change a paper setting of a paper feed stage. Each step of processing illustrated in FIG. 7 is implemented by the control unit 205 by loading and executing the control program from the ROM 207 and the HDD 209 on the RAM 208.

Figure 8:
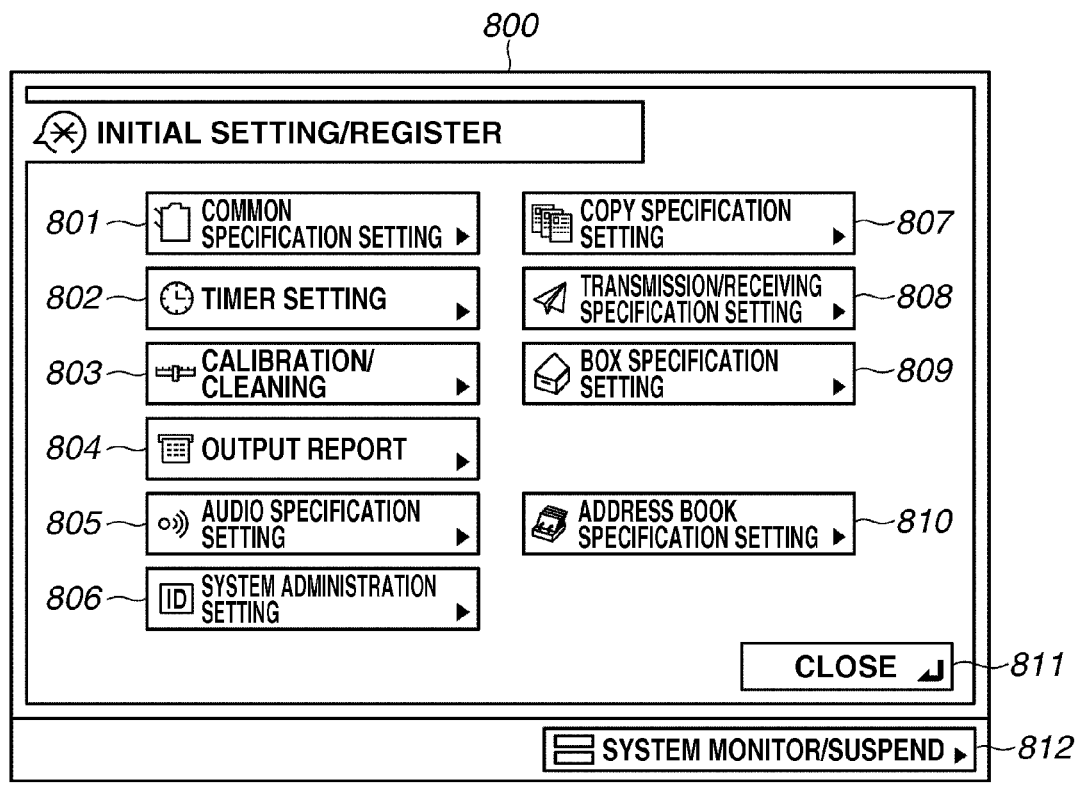
FIG. 8 illustrates an example of a UI displayed on the touch panel unit illustrated in FIG. 4.
Figure 9:
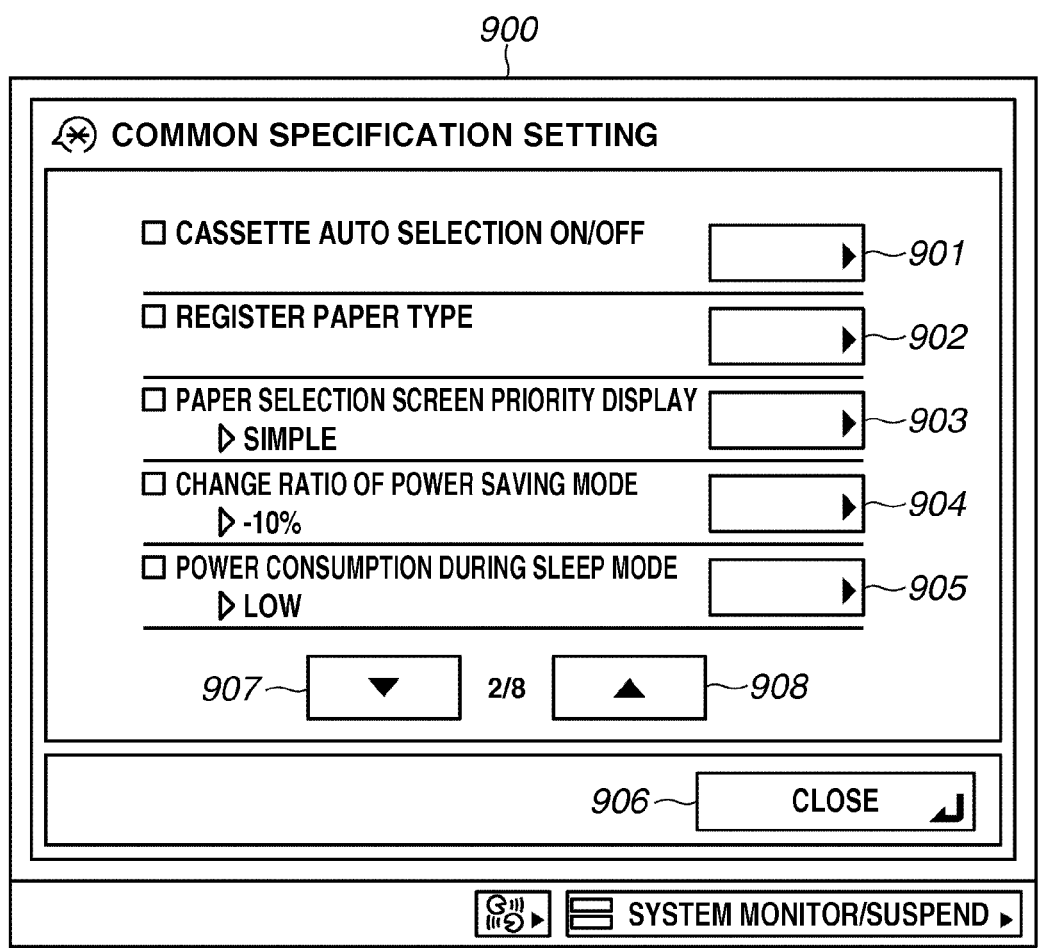
FIG. 9 illustrates an example of a UI displayed on the touch panel unit illustrated in FIG. 4.

When the user mode key 505 is pressed on the operation unit 204, the control unit 205 executes control for displaying a user mode basic screen 800 illustrated in FIG. 8. When a common specification setting button 801 included in the user mode basic screen 800 is pressed, the control unit 205 executes control for displaying a common specification setting change receiving screen 900 illustrated in FIG. 9 on the touch panel unit 401.

Figure 10:
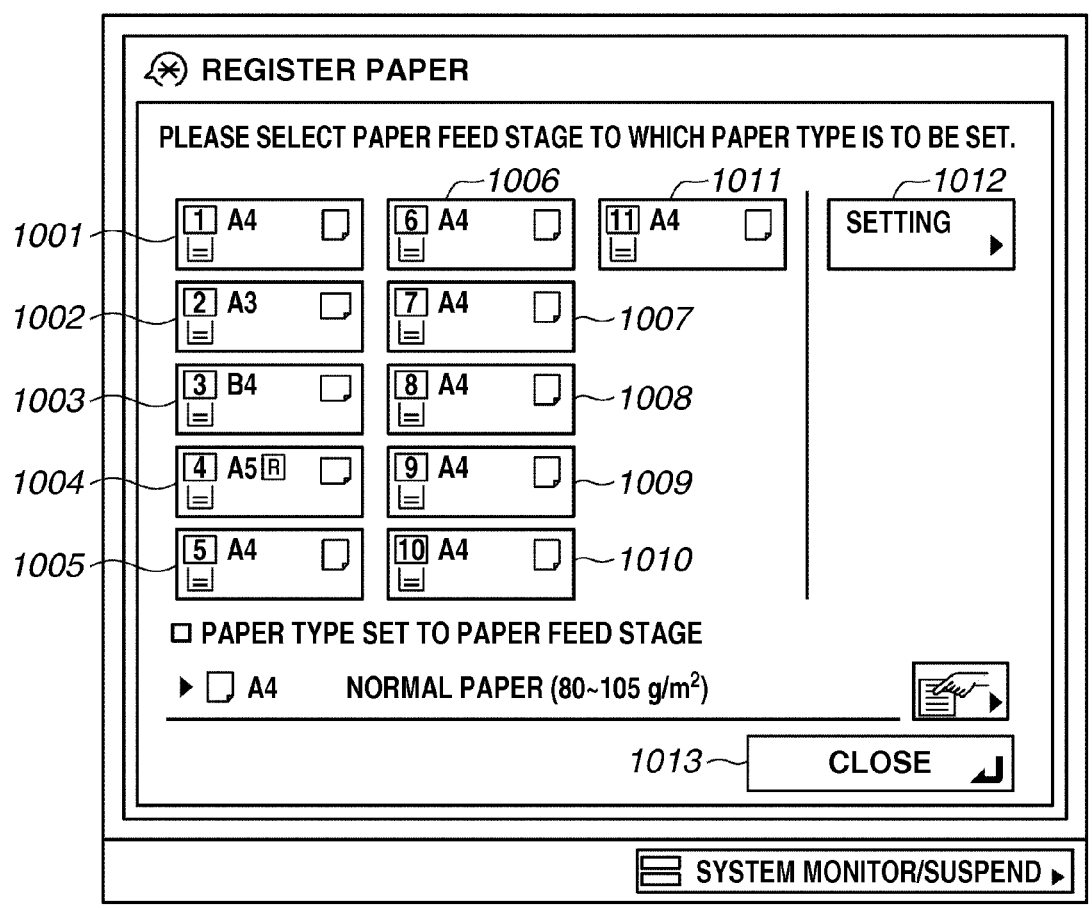
FIG. 10 illustrates an example of a UI displayed on the touch panel unit illustrated in FIG. 4.
Figure 11:
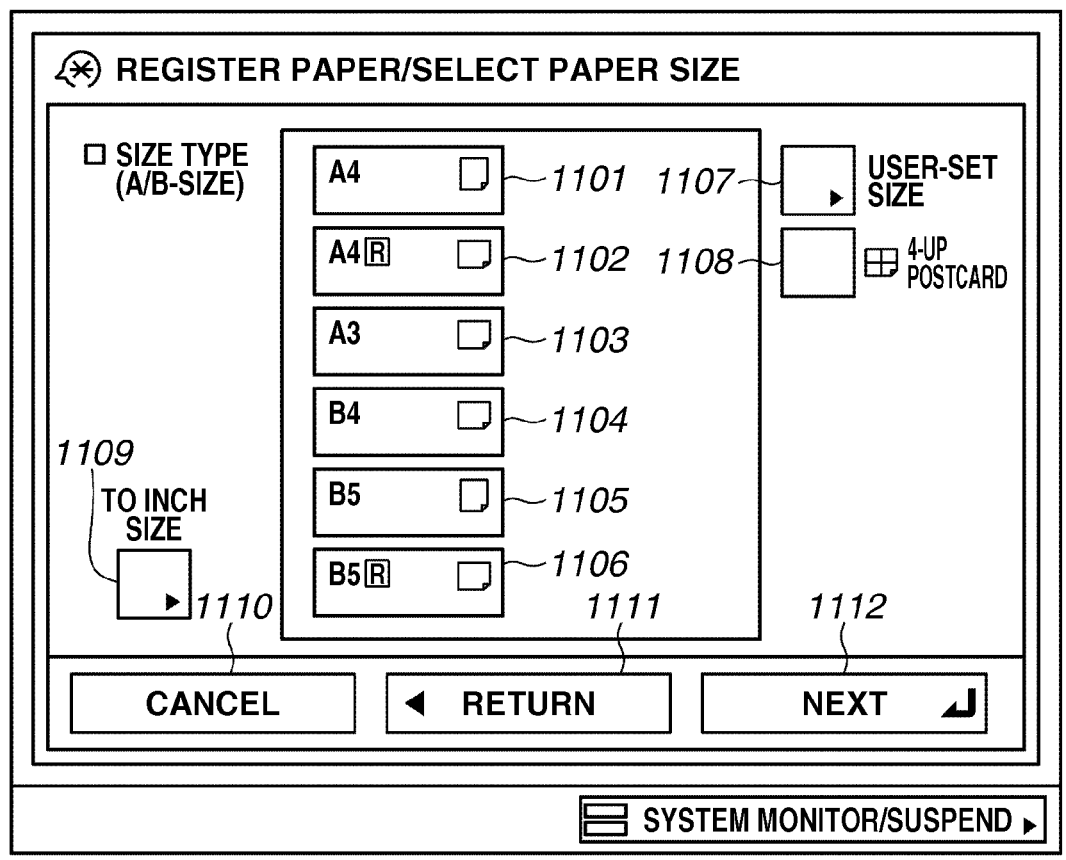
FIG. 11 illustrates an example of a UI displayed on the touch panel unit illustrated in FIG. 4.

When a paper type registration button 902 displayed on the common specification setting change receiving screen 900 is pressed, the control unit 205 displays a paper setting change screen illustrated in FIG. 10. When a setting change button 1012 illustrated in FIG. 10 is pressed, the control unit 205 stores a paper feed stage whose paper setting is requested to be changed, from among paper feed stages corresponding to paper feed stage selection buttons 1001 through 1011, on the RAM 208. In addition, the control unit 205 displays a paper size selection screen illustrated in FIG. 11 on the touch panel unit 401.

The control unit 205 stores the paper size corresponding to the size setting button 1101 through 1106 pressed by the user on the RAM 208. If a NEXT button 1112 is pressed, the control unit 205 displays a paper type selection screen illustrated in FIG. 12 on the touch panel unit 401.

The control unit 205 stores the paper type selected from among paper types corresponding to paper type selection buttons 1201 through 1208 on the RAM 208. If an OK button 1213 is pressed, the control unit 205 overwrites and updates paper feed stage information on the HDD 209 with the selected paper size and the paper type in association with paper feed stage information stored on the RAM 208 described above. Referring to FIG. 7, in step S701, the control unit 205 determines whether a paper type detailed information setting button 1210 has been pressed. If it is determined that the paper type detailed information setting button 1210 has been pressed (YES in step S701), then the processing advances to step S702.

In step S702, the control unit 205 displays a paper attribute detailed setting screen illustrated in FIG. 13. The paper attribute detailed setting screen is configured to receive the user instruction to change each paper attribute via the touch panel unit 401. In the present exemplary embodiment, as paper attribute information, a name, a type, a grammage, a characteristic, and a surface nature of the sheet, an adjustment value of a deviation correction amount, and a color (tint) can be set.

Figure 14:
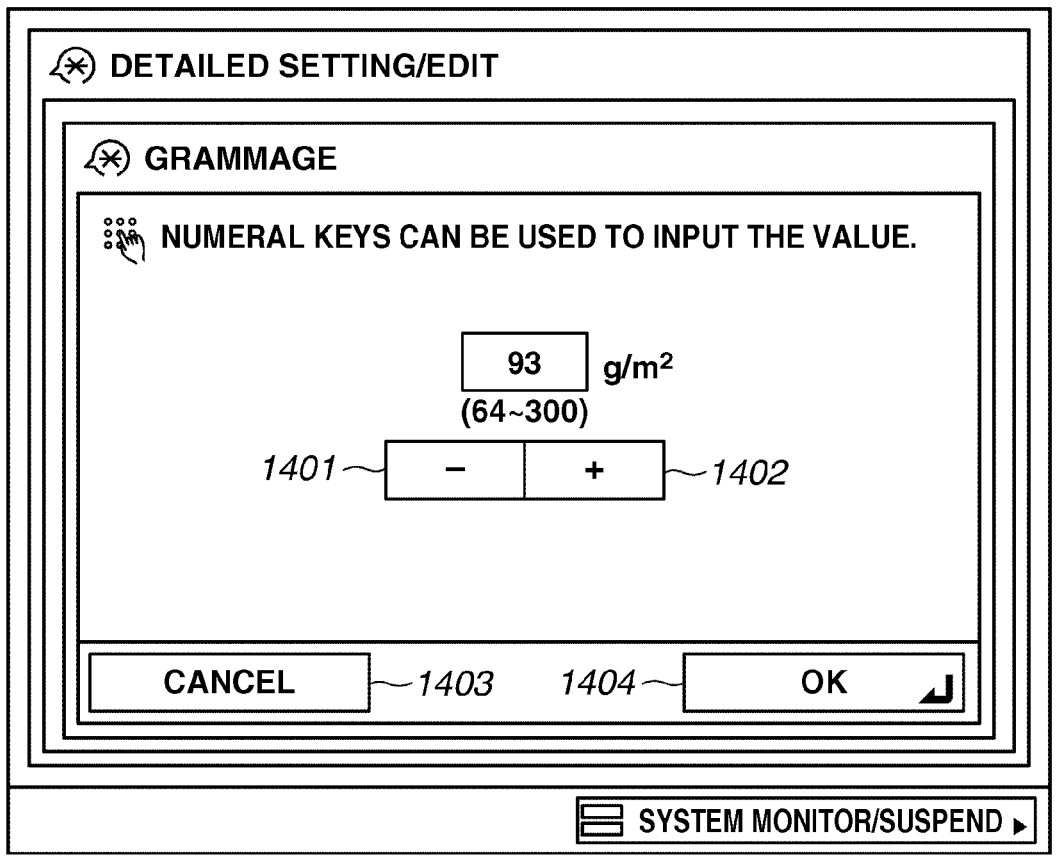
FIG. 14 illustrates an example of a UI displayed on the touch panel unit illustrated in FIG. 4.
Figure 15:
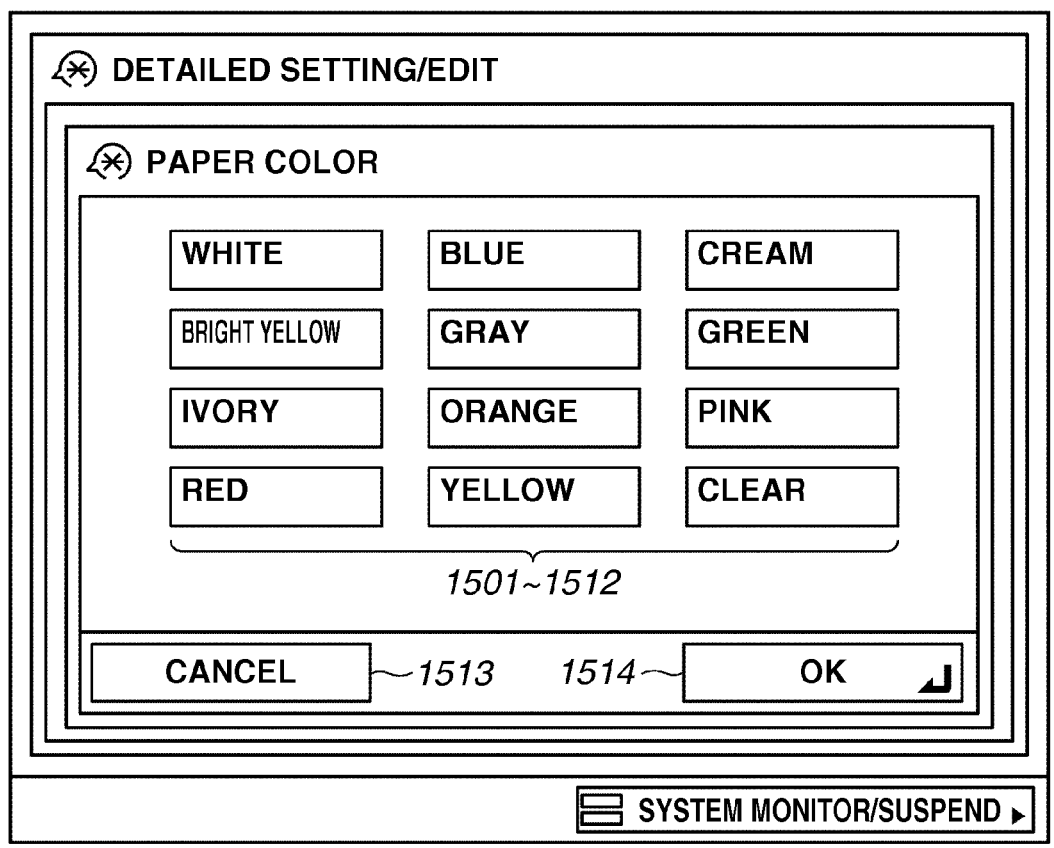
FIG. 15 illustrates an example of a UI displayed on the touch panel unit illustrated in FIG. 4.

When a grammage change button 1302 is pressed by a user operation, the control unit 205 displays a grammage change screen illustrated in FIG. 14. The grammage set by the user via the grammage change screen is stored on the RAM 208. Similarly, if a color change button 1306 is pressed, the control unit 205 displays a color change screen illustrated in FIG. 15. A color set by the user via the color change screen is stored on the RAM 208.

Figure 12:
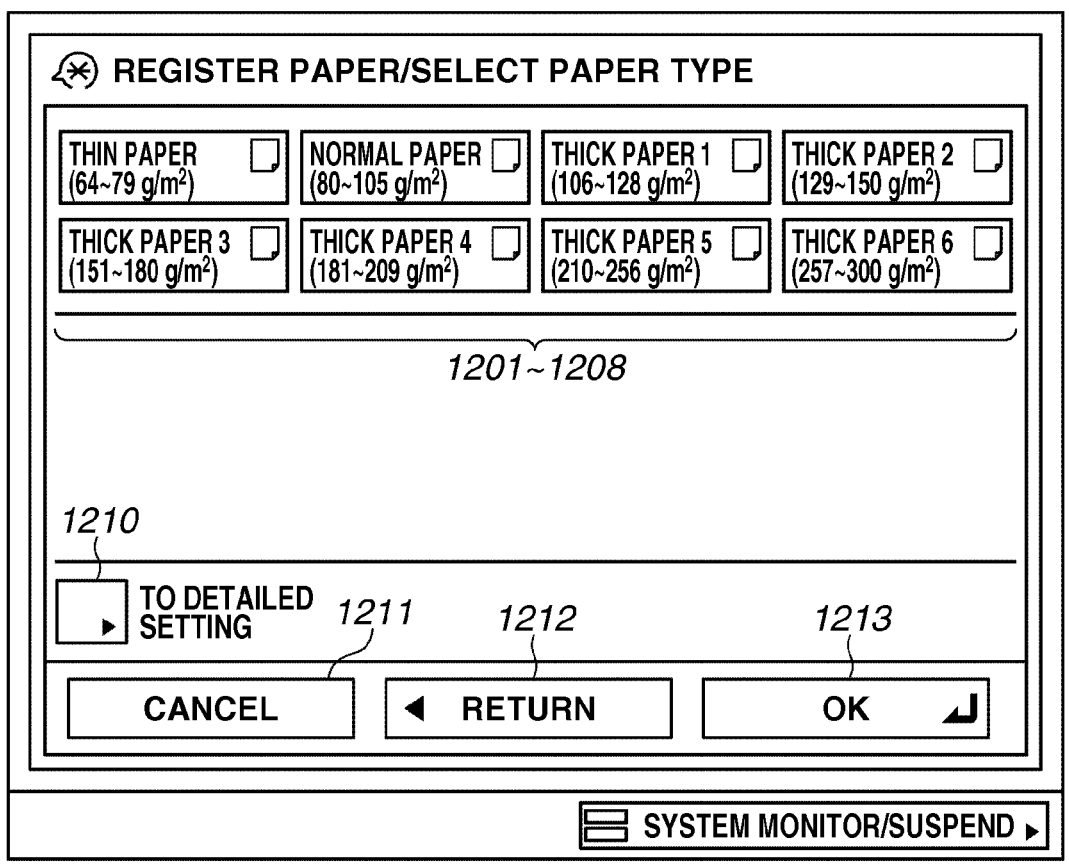
FIG. 12 illustrates an example of a UI displayed on the touch panel unit illustrated in FIG. 4.

If the user has pressed a close button 1307, the control unit 205 executes control for returning the screen to the paper type selection screen illustrated in FIG. 12. In step S703, the control unit 205 determines whether a paper type setting button has been pressed by the user. If the OK button 1213 has been pressed by the user, the control unit 205 determines that the paper type selection button has been pressed (YES in step S703), then the processing advances to step S704.

In step S704, the control unit 205 determines whether a same paper type setting warning display function has been enabled in the setting previously stored on the HDD 209. In the present exemplary embodiment, a flag which indicates whether the same paper type setting warning display function has been enabled is previously stored on the HDD 209. Accordingly, if the flag is set ON, the control unit 205 can determine that the same paper type setting warning display function has been enabled.

The same paper type setting warning display function is set according to a flow of processing illustrated in the flow chart in FIG. 16 and is stored on the HDD 209. An exemplary method for setting the same paper type setting warning display function will be described in detail below with reference to the flow chart in FIG. 16.

FIG. 16 is the flow chart illustrating a procedure for controlling the printing system 1000 according to the present exemplary embodiment. The processing corresponds to a setting procedure of the same paper type setting warning display function. Each step of processing illustrated in FIG. 16 is implemented by the control unit 205 by loading and executing the control program from the ROM 207 and the HDD 209 on the RAM 208.

Figure 17:
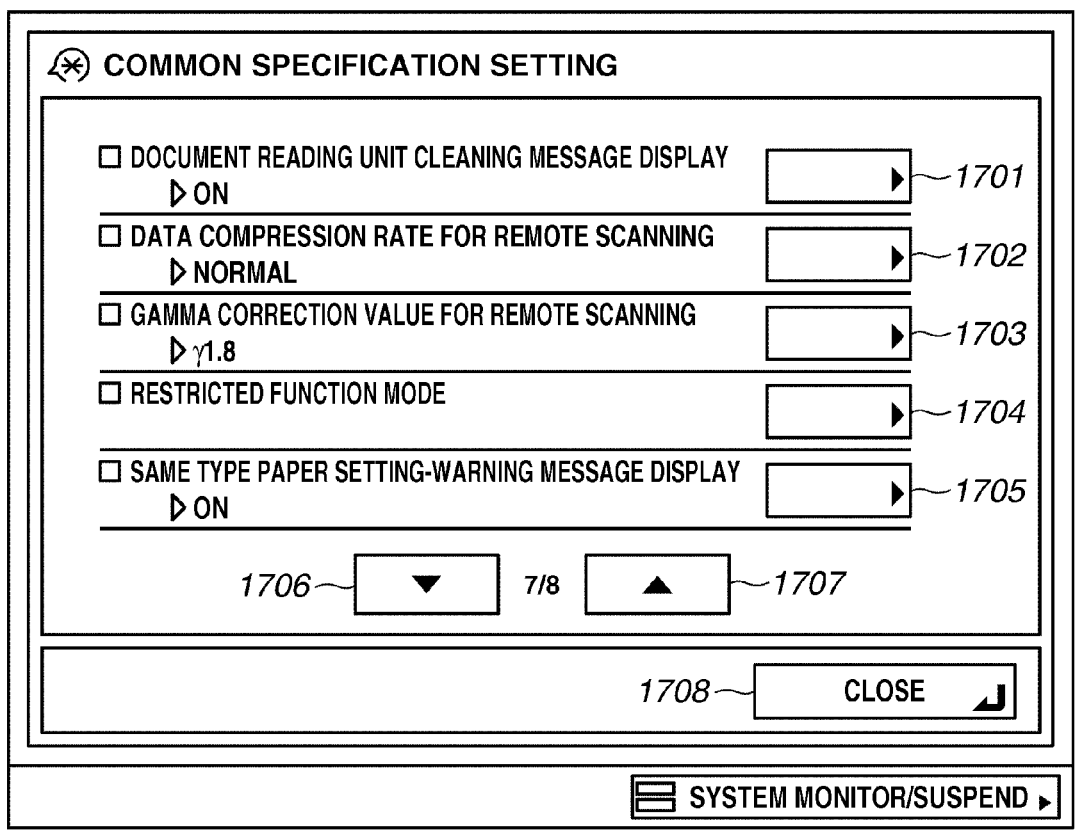
FIG. 17 illustrates an example of a UI displayed on the touch panel unit illustrated in FIG. 4.

When the user mode key 505 is pressed on the operation unit 204, the control unit 205 displays the user mode basic screen 800 illustrated in FIG. 8 on the touch panel unit 401. When the common specification setting button 801 included in the user mode basic screen 800 is pressed, the control unit 205 executes control for displaying a common specification setting change receiving screen illustrated in FIG. 17 on the touch panel unit 401.

Referring to FIG. 16, in step S1601, the control unit 205 determines whether a same paper type setting warning change button 1705 has been pressed by the user on the common specification setting change receiving screen displayed on the touch panel unit 401. If it is determined that the same paper type setting warning change button 1705 has been pressed and a setting change instruction is issued (YES in step S1601), then the processing advances to step S1602.

Figure 18:
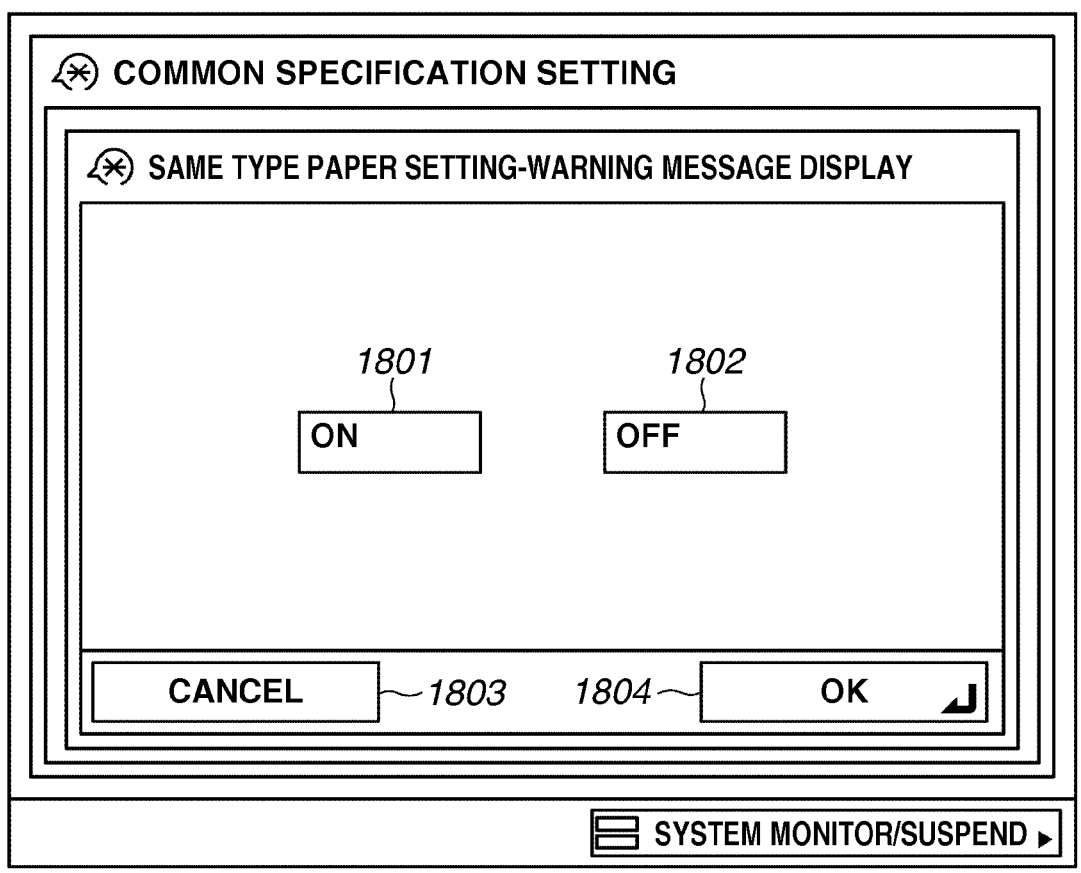
FIG. 18 illustrates an example of a UI displayed on the touch panel unit illustrated in FIG. 4.

In step S1602, the control unit 205 displays a same paper type setting warning changing screen illustrated in FIG. 18 on the touch panel unit 401. Then the processing advances to step S1603. In step S1603, the control unit 205 receives an instruction for changing the setting, which is input by the user by pressing a setting change button 1801 or 1802. The setting is stored on the RAM 208.

In step S1603, the control unit 205 determines whether the setting has been received. If it is determined that the user has input an instruction via the touch panel unit 401 and that an OK button 1804 has been pressed by the user (YES in step S1603), then the processing advances to step S1604. In step S1604, the control unit 205 stores the information stored on the RAM 208 at the timing on the HDD 209. If it is determined that the cancel button 1803 has been pressed by the user, the control unit 205 deletes all pieces of paper type setting warning information stored on the RAM 208. Then the processing ends.

Returning to FIG. 7, in step S704, the control unit 205 determines whether information about the same paper type setting warning changing (i.e., the above-described flag), which is stored on the HDD 209, has been enabled (ON). If it is determined that the same paper type setting warning changing information has been enabled (YES in step S704), then the processing advances to step S705.

On the other hand, if it is determined that the same paper type setting warning changing information has been disabled (NO in step S704), then the processing advances to step S708. In step S708, the control unit 205 stores the setting of the paper attribute, which has been stored on the RAM 208, on the HDD 209 in association with the paper feed stage. Then the processing ends.

In step S705, the control unit 205 acquires and compares the detailed setting of the paper attribute, which has been set in step S702, and a list of paper attributes currently set to each paper feed stage, which has been stored on the HDD 209. Further, in step S705, the control unit 205 determines that whether any other paper feed stage to which the same paper attribute has been set exists according to a result of the comparison. If it is determined that no other paper feed stage has the same paper attribute (NO in step S705), then the processing advances to step S708. On the other hand, if it is determined that any other paper feed stage to which the same paper attribute has been set exists (YES in step S705), then the processing advances to step S706.

The present exemplary embodiment can be more effective, for the range of paper feed stage to be compared with, in step S705, if the control unit 205 executes control for comparing only with a paper feed stage to which the automatic paper feed changing function has been enabled. However, the present invention is not limited to this.

In the present exemplary embodiment, the automatic paper feed changing function refers to a function executed by the control unit 205 for automatically changing the paper feed stage if another paper feed stage, to which the same paper attribute as the paper attribute set to the currently used paper feed stage, exists if the sheet cannot be fed from the currently used paper feed stage due to some causes.

If the control unit 205 determines that no paper feed stage to which the same paper attribute has been set or that no paper feed stage to which the same paper attribute has been set exists within the comparison target paper feed stage range (NO in step S705), then the processing advances to step S708. In step S708, the control unit 205 stores the setting of the paper attribute, which has been stored on the RAM 208, on the HDD 209 in association with the paper feed stage. Then the processing ends.

Figure 19:
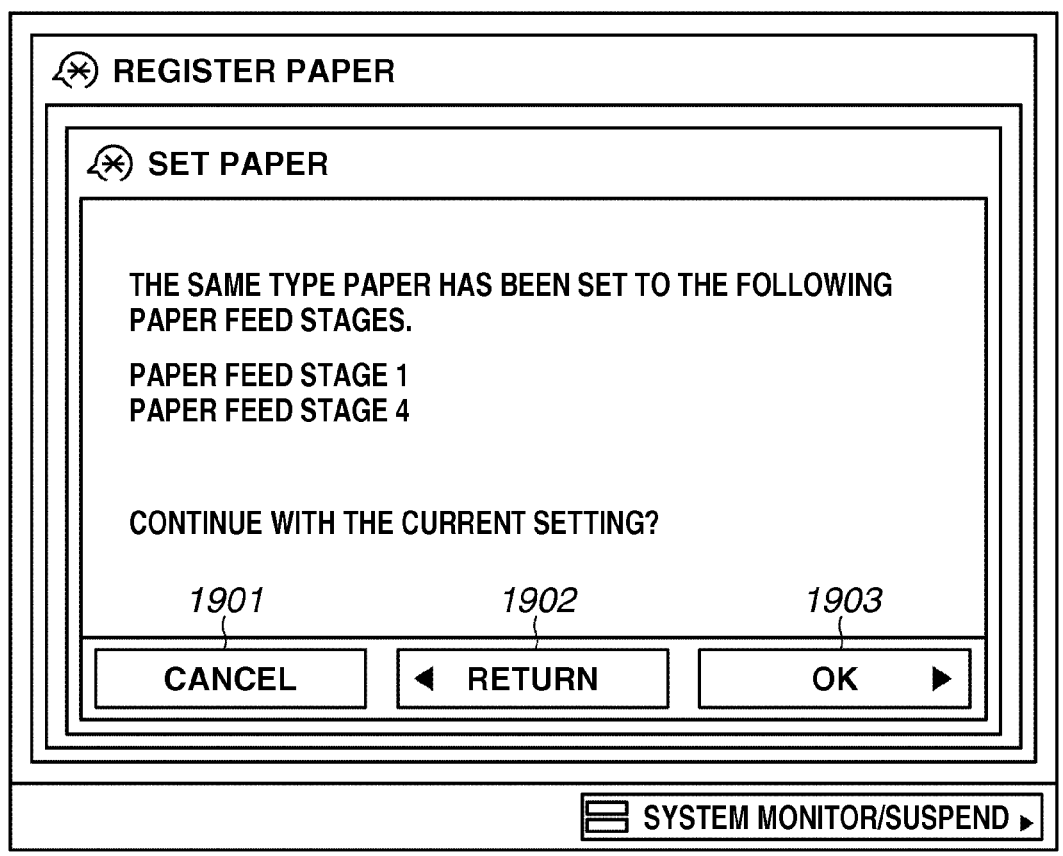
FIG. 19 illustrates an example of a UI displayed on the touch panel unit illustrated in FIG. 4.

In step S706, the control unit 205 acquires the paper feed stage to which the same paper attribute has been set and displays a warning screen illustrated in FIG. 19 on the touch panel unit 401 to prompt the user to determine whether to set the paper attribute. In step S707, the control unit 205 determines whether a cancel button 1901 has been pressed by the user. If it is determined that the cancel button 1901 has been pressed, the control unit 205 deletes all pieces of paper setting information stored on the RAM 208. Then the processing ends.

On the other hand, if it is determined that any button other than the cancel button 1901, such as a return button 1902, has been pressed (RETURN in step S707), then the control unit 205 deletes paper type setting information from the paper setting information stored on the RAM 208. Then the processing returns to step S702.

If an OK button 1903 is pressed in step S707 and if the paper feed stage to which the same paper attribute has been set is currently in use, the present exemplary embodiment can be more useful if the control unit 205 executes control for compulsorily exclude the paper feed stage whose paper setting change has been instructed from the target range of the paper feed stages used for the automatic paper feed change.

Figure 20:
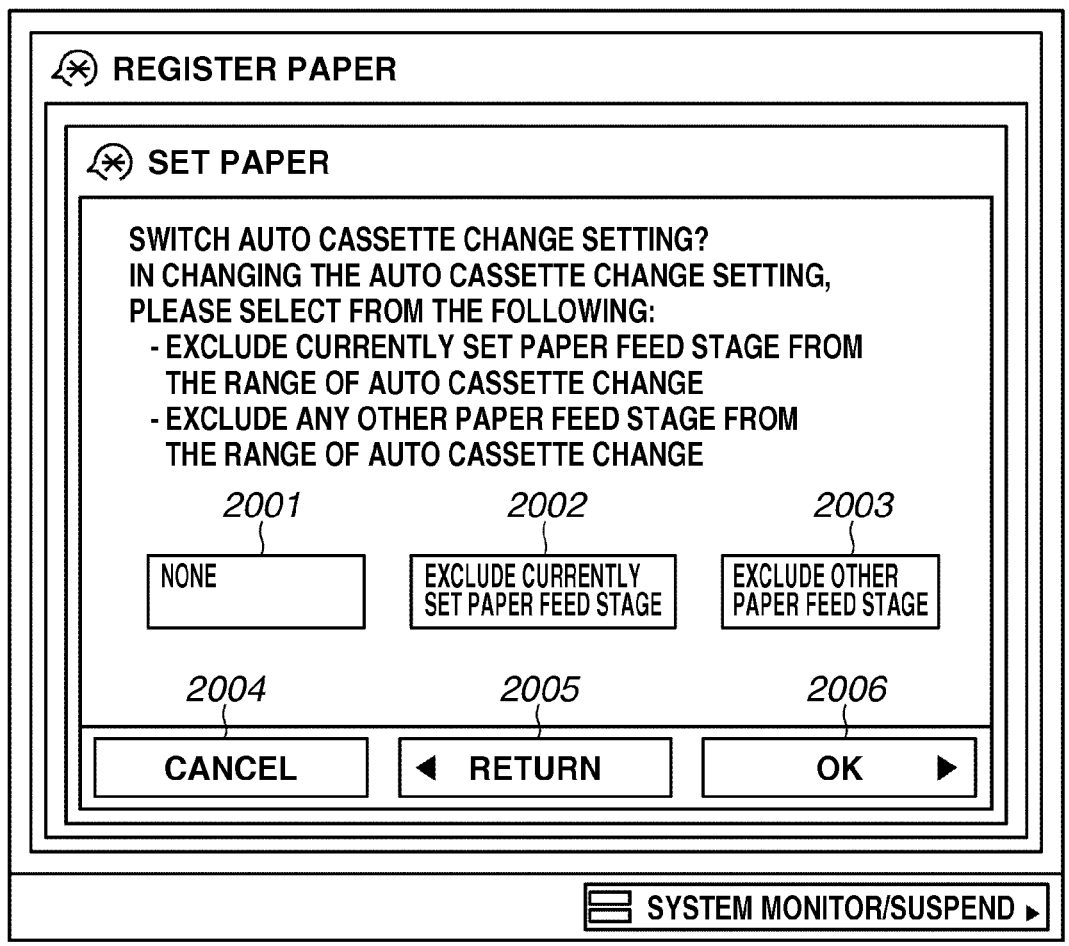
FIG. 20 illustrates an example of a UI displayed on the touch panel unit illustrated in FIG. 4.

In addition, if it is determined that the OK button 1903 has been pressed (OK in step S707), the control unit 205 displays a screen illustrated in FIG. 20, via which a target range of paper feed stages for which the automatic paper feed change is enabled, on the touch panel unit 401.

If a "no setting change" button 2001 is pressed, the control unit 205 does not newly store any information on the RAM 208. If the control unit 205 determines that an "exclude currently set paper feed stage" button 2002 has been pressed via the screen illustrated in FIG. 20, the control unit 205 stores the setting for enabling the automatic paper feed change function for the paper feed stage whose paper type setting change has been currently selected on the RAM 208. In addition, the control unit 205 stores a setting for disabling the automatic paper feed change function for another paper feed stage to which the same paper attribute has been set on the RAM 208.

If it is determined that the user has pressed an "exclude other paper feed stage" button 2003 via the screen illustrated in FIG. 20, then the control unit 205 stores a setting for disabling the automatic paper feed change function for the paper feed stage whose paper type setting change has been currently selected. In addition, the control unit 205 stores a setting for enabling the automatic paper feed change function for another paper feed stage to which the same paper attribute has been set on the RAM 208.

If it is determined that an OK button 2006 has been pressed via the screen illustrated in FIG. 20, the control unit 205 stores the setting of the automatic paper feed change range, which has been stored on the RAM 208, on the HDD 209. If it is determined that the cancel button 2004 has been pressed by the user, the control unit 205 deletes all pieces of the automatic paper feed change information stored on the RAM 208. Then the processing ends.

According to the present exemplary embodiment described above, when a paper attribute is set to a paper feed unit in which sheets are stored, if there is any paper feed stage to which the same paper attribute is set by using paper attribute information about the sheets stored in the paper feed unit, the control unit 205 can present a warning message to the user.

Further, the present exemplary embodiment can allow the user to select whether to exclude the paper feed stage whose paper attribute setting is changed from automatic paper feed change function target or to exclude another paper feed stage to which the same paper attribute has been set from the automatic paper feed change function target. To exclude the paper feed stage whose paper attribute setting is changed from the automatic paper feed change function target corresponds to a first setting. On the other hand, to exclude another paper feed stage to which the same paper attribute has been set (i.e., paper feed stages other than the paper feed stage set by the user) from the automatic paper feed change function target corresponds to a second setting.

With the above-described configuration, the present exemplary embodiment can shift the automatic paper feed change control, which uses the paper feed stage to which the paper attribute has been set by the user and another paper feed stage to which the paper attribute has been set, between the first setting and the second setting according to the selection by the user.

Aspects of the present invention can also be realized by a computer of a system or apparatus (or devices such as a CPU, a micro processing unit (MPU), and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-200828 filed Sep. 8, 2010, which is hereby incorporated by reference herein in its entirety.

What is claimed is:

1. A printing system including a plurality of sheet holding units, the printing system comprising:
    a setting unit configured to set a sheet attribute of a sheet held in a sheet holding unit;
    a storing unit configured to store the sheet attribute set by the setting unit for the sheet holding unit;
    an image forming unit configured to form an image on the sheet fed from the sheet holding unit;
    a control unit configured to switch, in a case where a sheet cannot be fed from a sheet holding unit used by image forming by the image forming unit, a feeding source for the image forming by the image forming unit for a sheet holding unit to another sheet holding unit, based on the sheet attribute stored in the storing unit;
    a determining unit configured to determine, in a case where a sheet attribute is set by the setting unit to a sheet holding unit, whether there is a second sheet holding unit to which the same sheet attribute as the sheet attribute which is set by the setting unit has been set by the setting unit, based on the sheet attribute stored in the storing unit; and
    a display unit configured to display, in a case where the determining unit determines that there is the second sheet holding unit information indicating that there is the second sheet holding unit to which the same sheet attribute which is set by the setting unit has been set by the setting unit,
    wherein the control unit is configured to permit, in a case where an instruction for setting the sheet attribute is received from a user after the display is executed by the display unit, setting the sheet attribute to the first sheet holding unit for switching the feeding source from the first sheet holding unit to another sheet holding unit.

2. The printing system according to claim 1, further comprising a selection unit configured to select between a first setting which does not include the sheet holding unit to which the sheet attribute is set by the setting unit in sheet holding units that can be switched by the control unit and a second setting which does not include a sheet holding unit other than the sheet holding unit to which the sheet attribute is set by the setting unit in the sheet holding units that can be switched by the control unit,
    wherein the control unit is configured to control switching of the sheet holding unit according to the first setting or the second setting selected by the selection unit.

3. The printing system according to claim 1, wherein the sheet attribute includes paper type information, sheet tint information, sheet grammage information, sheet surface nature information, and sheet name information.

4. A method for controlling a printing system including a plurality of sheet holding units, the method comprising:
    setting a sheet attribute of a sheet stored in a sheet holding unit;
    storing, in a storing unit, the set sheet attribute for the sheet holding unit;
    forming an image on the sheet fed from the sheet holding unit;
    switching, in a case where a sheet cannot be fed from a sheet holding unit used by image forming, a feeding source for the image forming from a sheet holding unit to another sheet holding unit, based on the sheet attributed stored in the storing unit;

determining, in a case where the sheet attribute is set to a first sheet holding unit, whether there is a second sheet holding unit to which the same sheet attribute as the sheet attribute which is set has been set, based on the sheet attribute stored in the storing unit;

displaying, in a case where it is determined that there is the second sheet holding unit, information, on a display unit, indicating that there is the second sheet holding unit to which the same sheet attribute as the sheet attribute which is set has been set; and permitting, in a case where an instruction for setting the sheet attribute is received from a user after the display is executed, setting the sheet attribute to the first sheet holding unit for switching the feeding source from the first sheet holding unit to the another sheet holding unit.

5. A non-transitory computer readable storage medium for storing a computer program for controlling a printing system including a plurality of sheet holding units, the computer program comprising:

a code to set a sheet attribute of a sheet stored in a sheet holding unit;

a code to store, in a storing unit, the set sheet attribute for the sheet holding unit;

a code to form an image on the sheet fed from the sheet holding unit;

a code to switch, in a case where a sheet cannot be fed from a sheet holding unit used by image forming, a feeding source for the image forming from the sheet holding unit to another sheet holding unit, based on the sheet attribute stored in the storing unit;

a code to determine, in a case where the sheet attribute is set to a first sheet holding unit, whether there is a second sheet holding unit to which the same sheet attribute as the sheet attribute which is set has been set, based on the sheet attribute stored in the storing unit;

a code to display, in a case where it is determined that there is the second sheet holding unit, information, on a display unit, indicating that there the second sheet holding unit to which the same sheet attribute as the sheet attribute which is set has been set; and a code to permit, in a case where an instruction for setting the sheet attribute is received from a user after the display is executed, setting the sheet attribute to the first sheet holding unit for switching the feeding source from the first sheet holding unit to another sheet holding unit.

6. The printing system according to claim 1, wherein the display unit displays, in a case where the determining unit determines that there is the second sheet holding unit, information indicating the second sheet holding unit to which the same sheet attribute as the sheet attribute which is set by the setting unit has been set by the setting unit.

\* \* \* \* \*